O. K. PORTER.
FRUIT CLEANER.
APPLICATION FILED MAR. 16, 1912.
1,058,461.
Patented Apr. 8, 1913.
2 SHEETS—SHEET 2.
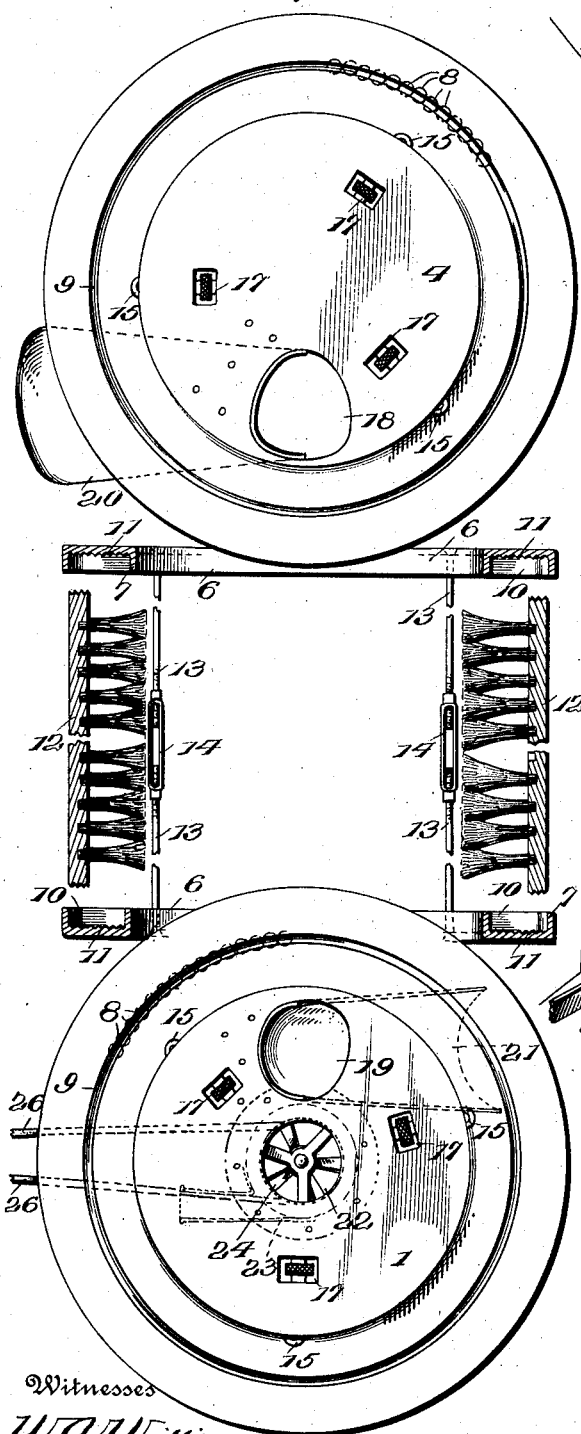
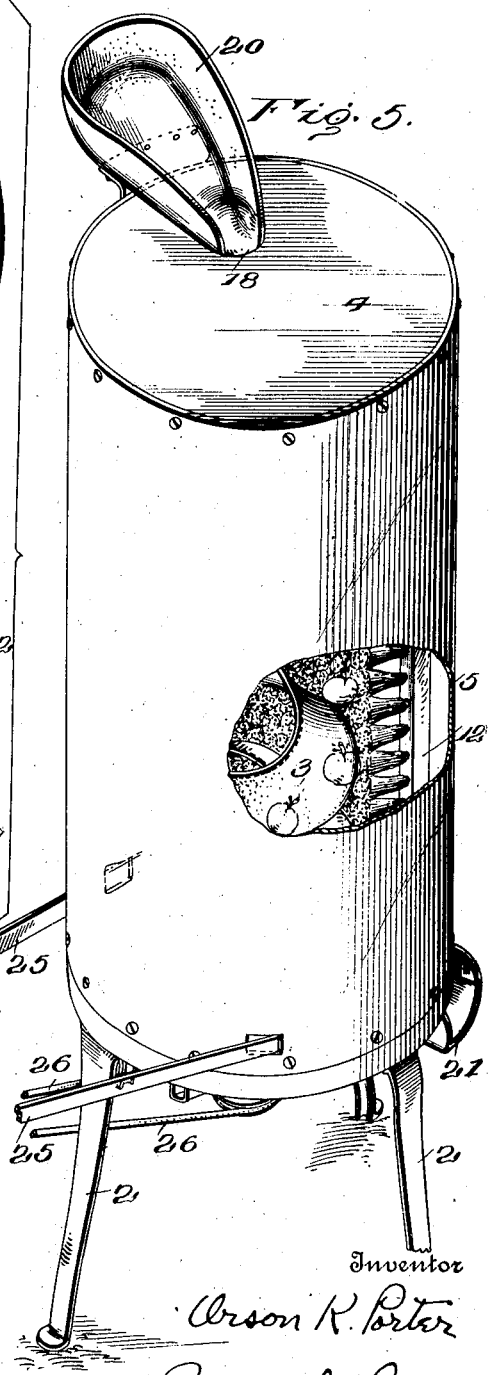

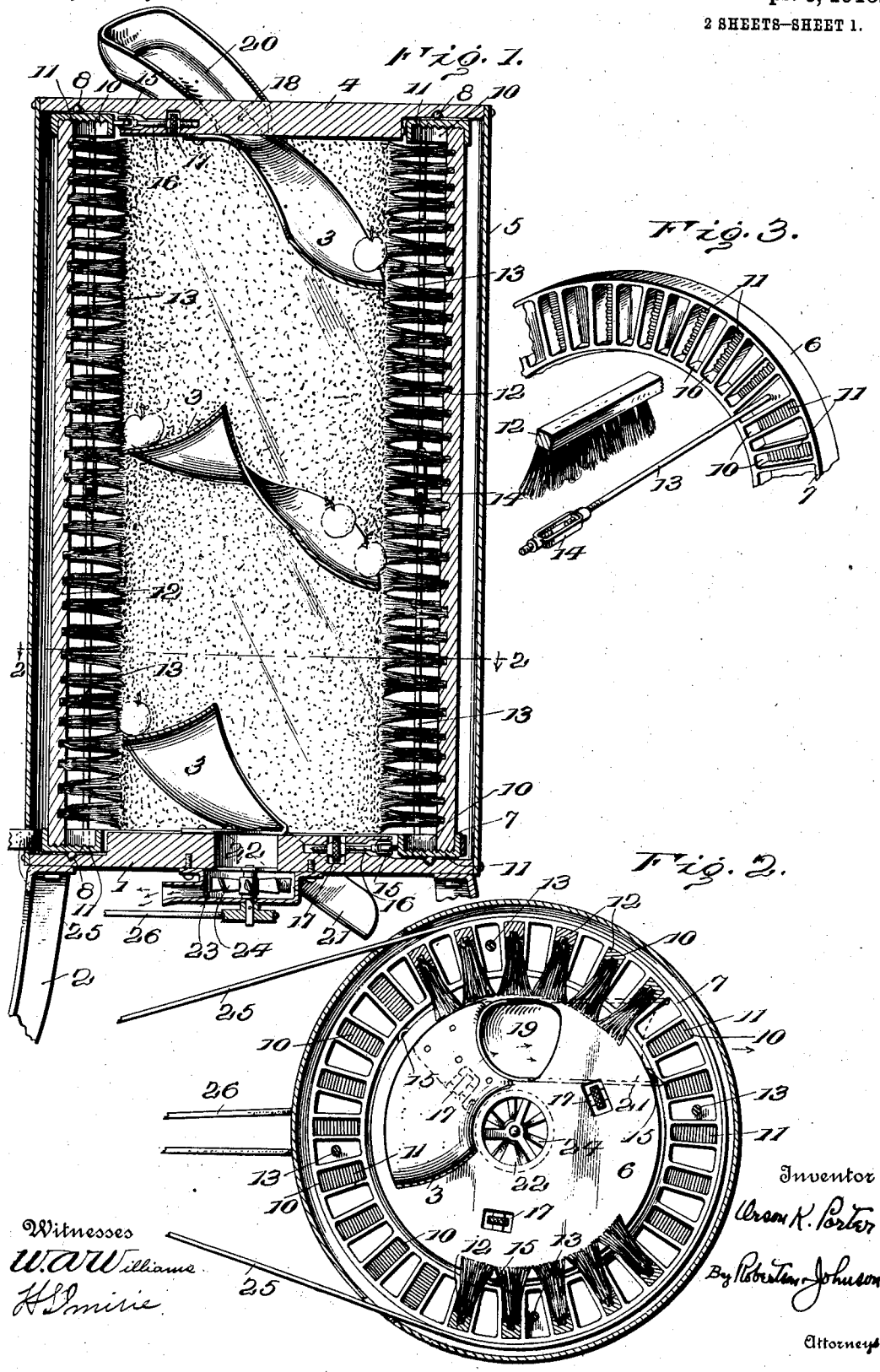

UNITED STATES PATENT OFFICE.

ORSON K. PORTER, OF THE DALLES, OREGON, ASSIGNOR TO OREGON FRUIT CLEANER COMPANY, OF THE DALLES, OREGON, A CORPORATION OF OREGON.

FRUIT-CLEANER.

1,058,461.  Specification of Letters Patent.  Patented Apr. 8, 1913.

Application filed March 16, 1912.  Serial No. 684,123.

*To all whom it may concern:*

Be it known that I, ORSON K. PORTER, a citizen of the United States of America, and a resident of The Dalles, in the county of Wasco and State of Oregon, have invented certain new and useful Improvements in Fruit-Cleaners, of which the following is a specification.

My invention relates to fruit cleaners and has for its object the production of a machine for this purpose of unusual efficiency and compactness and suitable for handling fruit of a delicate nature such as apples which are readily subject to injury by bruising. In carrying out this purpose I provide a spiral runway which, though of comparatively little height, permits the fruit to pass through a long distance. With this spiral is associated brushing means driven in the opposite sense to the direction of the spiral so as to retard the progress of the fruit down the runway. The apparatus thus constitutes a differential feeding and cleaning mechanism.

I have illustrated the spiral runway as stationary and as inclosed by a brushing cylinder co-axial therewith and substantially in contact with the outer edge of the spiral runway. The spiral is constructed to cause the fruit to roll into contact with the brushing means with which the interior of the cylinder is provided. When the cylinder is driven at the proper speed and in an opposite sense to the direction of the spiral, the force of gravity is partially overcome so that the fruit passes slowly down along the runway, turning over and over, and is given a thorough cleaning by the brushing means before it passes out of the apparatus.

Referring to the drawings: Figure 1 is a vertical section through the machine. Fig. 2 is a section on the line 2—2 of Fig. 1, looking in the direction of the arrows. Fig. 3 is a detail perspective view illustrating the manner in which the brushing sections and the top and base sections are secured together. Fig. 4 is a view illustrating the brushing cylinder in cross section and the base and top separated therefrom, the former being shown in plan looking down thereon and the latter being shown in plan looking upward at the under side thereof. Fig. 5 is a perspective view of the entire cleaner, a portion of the outer cylindrical casing being broken away to show the construction of the brushing cylinder and the spiral runway.

In the figures as thus described the stationary base 1 is supported by any suitable means as the legs 2 and has permanently secured to it the spiral runway 3 which may be clothed with soft material as lamb's wool and whose upper end is secured to the under side of the top 4 which corresponds substantially to the base 1. To the base 1 and the top 4 is secured an outer casing 5 within which is rotatably mounted the brushing cylinder. This cylinder is provided at its top and bottom with corresponding socket plates 6 and 7 mounted to rotate on bearing balls 8 located in raceways 9 in the base and top respectively. These socket plates are provided with a plurality of spaced radial sockets 10 which are suitably corrugated or roughened at 11 to assist in holding adjustably in position the vertical brushing members 12 which are preferably brushes formed of one or more rows of tufts of bristles mounted in wooden backs which are sufficiently strong without being heavy and whose ends are roughened to correspond with the bottoms of the sockets. The tufts spread so that they form a substantially continuous brushing covering for the interior of the cylinder although it is not essential that this surface should be absolutely continuous, it being only necessary to prevent any danger of the fruit passing over the edge of the spiral. The top and bottom socket plates 6 and 7 and the brushing members 12 are held together securely by tie rods 13 provided with turnbuckles 14. The construction is obviously such that the brushing members may be adjusted toward the spiral as the brushing surface becomes worn, the radial sockets causing the brushing members to approach each other as they are moved inward and thus enabling the brushes to be used until they are worn down almost to the backs. The brushes should be of comparatively soft quality and extend inward from the supporting backs a suitable distance, say three inches. Obviously, however, the length of the tufts is not material. The brushing cylinder is kept in proper relation to the spiral by adjustable guide rollers 15 mounted on bolts 16 adjustable radially in slots in the base and top by means of milled thumb nuts 17. These guide rollers co-act with the inner flanges of the socket plates 6 and 7. Obviously other centering means might be provided but by employing three or more of these rollers any tendency to eccentric movement is avoided.

The top and the base 1 are provided respectively with inlet and outlet openings as shown at 18 and 19, an inlet chute 20 which may have a canvas bottom conducting the fruit through the hole to the beginning of the spiral runway and the outlet chute 21 receiving the fruit from the lower end of the spiral and conducting it out of the apparatus.

The spiral runway slants downwardly and outwardly toward the brushing means on the interior of the cylinder so that the fruit is at all times caused to roll into contact with the brushing means. In order to prevent undesirable wedging action between the runway and the brushing means, I prefer to make the upper side of the spiral concave, thus providing a small space or pocket in which the fruit can rest while being acted upon by the brush, thus avoiding the wedging action referred to without the possibility of the movement of the fruit out of reach of the brushing means. This feature of the spiral runway is very clearly illustrated in Figs. 1 and 5.

To permit the ready removal of dust and other matter brushed from the fruit an axial space is left in the spiral and the base is provided with an opening 22 below which is located in its casing 23 a suction fan 24 which draws such material down through the cleaner and separates it from the fruit. This fan as well as the brushing cylinder is driven from any suitable source of power, driving belts 25—26 being illustrated.

The method of operation of the cleaner will be apparent from what has already been said.

The fruit, as it passes down through the machine along the spiral runway, not only rolls over and over but is constantly made to roll against the brushing surface by reason of the configuration of the spiral above described. At the same time the brush which rotates in the opposite sense to the direction of the spiral retards the movement of the fruit down the runway and gives it a prolonged and thorough brushing before it reaches the outlet. The speed with which the fruit passes through the machine may be altered in accordance with conditions by varying the speed of the brushing means. Comparatively clean fruit may be permitted to pass through the machine more rapidly than fruit which needs more prolonged brushing by rotating the brushing cylinder at a lower speed. It is also to be noted that the cylindrical brushing surface coacting with the spiral runway tends to turn the fruit on a different axis from that on which gravity causes it to turn, the result being that every part of the fruit is thoroughly brushed. The fact that the spiral is not a mere groove, and especially not an inclosed passage but a runway permitting free rolling movement, is important. Although adjustable, the brushing members are stationary with respect to their r..atable support, springs to force them toward the fruit not being needed or desirable. The slant of the upper side of the runway from edge to edge across the spiral is continuous and gentle. The fruit is thus free to roll toward the brushing surface as well as down the runway.

Obviously a single machine can clean fruit varying widely in size.

What I claim as my invention is:

1. A fruit cleaner comprising in combination a stationary spiral runway having a vertical axis, a rotatable cylinder inclosing said runway and coaxial therewith and provided with a brushing surface adjacent the outer edge of said runway, said spiral runway being inclined downwardly and outwardly, and means for rotating the cylinder in the opposite sense to the direction of the spiral.

2. A fruit cleaner comprising a spiral runway having a vertical axis and having its upper side concave and slanting downwardly and outwardly, a rotatable cylinder inclosing said spiral runway, brushing means located on the interior of said cylinder adjacent the outer edge of said spiral runway for co-action with the fruit as it passes down the spiral runway, and means for rotating said cylinder in the opposite sense to the direction of the spiral.

3. A fruit cleaner comprising an open spiral runway having a vertical axis and having its upper side slanting gently and continuously from its inner to its outer edge, a rotatable cylinder coaxial with and inclosing said spiral runway, brushing means located on the interior of said cylinder and forming a substantially continuous brushing surface adjacent the outer edge of said spiral runway for coaction with the fruit as it passes down the runway, and means for rotating said cylinder in the opposite sense to the direction of the spiral.

4. A fruit cleaner comprising a base, a stationary spiral runway having a vertical axis and mounted on said base, a top secured to the upper end of said runway, a hollow cylinder coaxial with and inclosing said spiral runway and rotatably mounted on said base, said cylinder being provided with a brushing surface adjacent the outer edge of the runway and said runway sloping downwardly and outwardly toward said brushing surface, and means for rotating said cylinder in the opposite sense to the direction of the spiral.

5. A fruit cleaner comprising a base, a stationary spiral runway having a vertical axis and mounted on said base, a top secured to the upper end of said runway, a hollow cylinder coaxial with and inclosing said spiral runway and rotatably mounted on said base, said cylinder being provided with a brushing surface adjacent the outer edge of the runway and said runway sloping downwardly and outwardly toward said brushing surface, means for rotating said cylinder in the opposite sense to the direction of the spiral, the base top and spiral being provided with a hole or passage therethrough, a suction fan in communication with said holes and passage, and means for driving the same.

6. A fruit cleaner comprising an upright spiral runway down which fruit may freely roll by gravity and whose upper surface is inclined downwardly and transversely, a rotatable brushing means located adjacent an edge of said spiral runway for coaction with the fruit as it passes down along the same, and means for rotating the said brushing means in the opposite sense to the direction of the spiral thereby tending to feed the fruit upward along the runway and providing a differential cleaning and feeding mechanism.

7. A fruit cleaner comprising in combination a brushing device provided with rigidly mounted brushing means, a stationary runway receiving the fruit at its upper end and down which the fruit may freely roll by gravity, said runway slanting downwardly and also slanting toward the said brushing means and having its edge substantially in contact therewith, and means for driving said brushing device in the opposite direction to that of the runway to tend to feed the fruit upward along the runway in opposition to but less powerfully than gravity thus constituting a differential cleaning and feeding mechanism.

8. A fruit cleaner comprising a base, a stationary spiral runway having a vertical axis and mounted on said base, a top secured to the upper end of said runway, a hollow cylinder coaxial with and inclosing said spiral runway and having antifriction bearings in said base and top, adjustable antifriction devices for centering said cylinder, said cylinder being provided with a substantially continuous, rigidly supported brushing surface located adjacent the outer edge of the runway and said runway sloping downwardly and outwardly toward said brushing surface, and means for rotating said cylinder in the opposite sense to the direction of the spiral.

9. In a fruit cleaner, a spiral runway, a pair of oppositely disposed annular socket plates provided with sockets, located in substantially horizontal planes and facing each other in pairs, vertical brushing members having backs whose ends are located in corresponding sockets in said oppositely disposed socket plates and adjustable therein toward and from the runway, and means for securing said parts together.

10. In a fruit cleaner, a pair of oppositely disposed annular socket plates provided with radial sockets having corrugated or roughened portions, brushing members having the ends of their backs roughened or corrugated and located in corresponding sockets in the annular socket plates and having brushing means extending inwardly from said backs, and means for securing said parts firmly together.

11. In a fruit cleaner, a pair of oppositely disposed annular socket plates provided with radial sockets, vertical brushing members having backs whose ends are located in corresponding sockets in said oppositely disposed socket plates, said sockets being of materially greater length than the thickness of said backs to permit radial adjustment of said vertical brushing members, and means for releasably securing said parts together.

12. A fruit cleaner comprising in combination a base, a stationary spiral runway mounted thereon, a top corresponding in general with said base and secured thereto, guide rollers mounted adjustably in said top and base for radial movement, a brushing cylinder rotatably mounted on said base centered by said rollers and having also a bearing on the under side of the top, said brushing cylinder being provided with a substantially continuous rigidly supported brushing surface adjacent the outer edge of the spiral runway, and means for rotating said brushing cylinder.

In testimony whereof I affix my signature in presence of two witnesses.

ORSON K. PORTER.

Witnesses:
JOHN L. FLETCHER,
MARGARET E. DILLER.